No. 795,215.

Patented July 18, 1905.

UNITED STATES PATENT OFFICE.

FREDERICK FORSTER, OF NEW YORK, N. Y.

COMPOSITION FOR CLEANING PRINTING-SURFACES.

SPECIFICATION forming part of Letters Patent No. 795,215, dated July 18, 1905.

Application filed November 25, 1904. Serial No. 234,307.

*To all whom it may concern:*

Be it known that I, FREDERICK FORSTER, of 838 Eagle avenue, in the city and county of New York and State of New York, have invented certain new and useful Improvements in Cleansing and Preparing Plates Used for Lithographic-Printing Purposes; and I hereby declare that the following is a full, clear, and exact description thereof.

This invention is an improved composition for cleaning printing-surfaces, particularly lithographic plates, such as aluminium, zinc, German or American printing metal, and other materials used for making printing-surfaces for plate-printing. The composition is also useful for cleansing other surfaces and objects, and therefore I do not wish to restrict myself specifically to its use with any particular material or printing-surface.

The invention consists in the novel composition for cleaning printing-surfaces, as hereinafter described and claimed.

I preferably use two cleaning solutions, which I shall call "solution No. 1" and "solution No. 2." These solutions are compounded as follows:

*Solution No. 1.*—Bichromate of potassium, one part; sulfuric acid, two parts; water, twenty parts.

*Solution No. 2.*—Powdered purified alum, four parts; carbonate of soda, four parts; carbonate of potassium, one part; ten-per-cent. solution gallic acid, ten drops; caustic hydrate of soda, four parts; water, thirty-two parts.

In compounding solution No. 2 I prefer to first mix the alum and water, care being taken to remove or keep out any foreign substances or chemicals. The other ingredients are then added thereto.

I do not herein claim solution No. 1, nor do I restrict myself to the particular solution No. 1 set forth, the present invention residing in the principal solution, No. 2; but I find best results are obtained by using the two solutions successively, as hereinafter described, when cleansing printing-surfaces.

In practice the solutions are used successively or alternately to produce the best results. However, the solutions in some instances may be separately used with beneficial effects, and therefore I do not wish to restrict myself to the use of both at all times.

For cleaning aluminium, zinc, white metal, German printing metal, American printing metal, and all other materials commonly used for lithographic-printing purposes in the form of plates I proceed as follows:

First, place the plate in an ordinary asphaltum-lined trough and apply solution No. 1 by pouring same evenly thereover. Let solution remain on plate for about five minutes. Then rub plate with felt or other soft material for the purpose of removing surplus dirt. Then flush plate with water. Dry plate.

Second, then apply solution No. 2 in the same manner as above by distributing evenly over plate and rubbing gently at intervals for six or seven minutes with felt or other soft material, which will remove all ink, grease, or other foreign matter. Flush the plate again with water and then again apply solution No. 1 for a minute or two. Then give plate a final washing with plain water and put in rack to dry. The plate is now thoroughly cleaned and prepared for use for lithographic printing without any other preparation or solution being used and without any rubbing except as stated above.

As the strength of the chemicals varies somewhat, the hydrometer test for solution No. 2 is 80. The hydrometer referred to is that known on the market as the "actinometer." The solution of gallic acid is to be used in the proportion stated when each "part" represents an ounce—that is, ten drops of gallic acid to each thirteen ounces of chemicals used, exclusive of water.

The solution No. 2 will not only clean prepared plates, but is useful to prepare new plates for printing, as it will remove the "grease" or foreign substances that are in or on the metal of such plates and must be removed before perfect printing is possible, and the use of the solution on either new or old plates is included herein. The solution No. 2 can also be used to clean brass, silver, copper, zinc, aluminium, "white metal," and steel.

Having thus described my invention, what

I claim as new, and desire to secure by Letters Patent, is—

1. A cleansing solution consisting of alum, carbonate of soda, carbonate of potassium, gallic acid, hydrate of soda, and water, substantially as and for the purpose set forth.

2. A cleansing solution consisting of a solution of approximately four parts of powdered alum; four parts carbonate of soda; one part carbonate of potassium; ten drops of ten-per-cent. solution gallic acid; four parts caustic hydrate of soda and thirty-two parts water, substantially as described.

In testimony that I claim the foregoing as my own I affix my signature in presence of two witnesses.

FREDERICK FORSTER.

In presence of—
HERBERT W. CLARK,
GEORGE RETZ.